United States Patent [19]

Reiter

[11] 3,994,384

[45] Nov. 30, 1976

[54] CONVEYOR BELT CLEANER
[75] Inventor: Robert C. Reiter, Aurora, Ill.
[73] Assignee: Material Control, Inc., Aurora, Ill.
[22] Filed: Apr. 18, 1975
[21] Appl. No.: 569,344

[52] U.S. Cl. ............................... 198/497; 15/256.6; 74/230
[51] Int. Cl.² ........................................ B65G 45/00
[58] Field of Search .................... 198/188, 229, 230; 15/256.5, 256.6; 74/230; 151/68

[56] References Cited
UNITED STATES PATENTS

| | | | |
|---|---|---|---|
| 1,033,163 | 7/1912 | Ellmann | 151/68 |
| 3,598,231 | 8/1971 | Matson | 198/230 |
| 3,656,610 | 4/1972 | McWilliams | 198/230 |
| 3,674,131 | 7/1972 | Matson | 198/230 |

Primary Examiner—John J. Love
Assistant Examiner—Joseph E. Valenza
Attorney, Agent, or Firm—Cullen, Settle, Sloman & Cantor

[57] ABSTRACT

An assembly of cleaners for a conveyor belt comprising a tubular support having first and second series of mounting openings which are arranged in a staggered or offset relationship to permit cleaners having spring arms of equal length to be mounted or positioned on the support without any interference between adjacent cleaners. With such a construction, the scraper blades provided at the ends of the scraper arms overlap but do not hit each other as normally occurs when the mounting openings in the support are longitudinally aligned rather than staggered.

9 Claims, 7 Drawing Figures

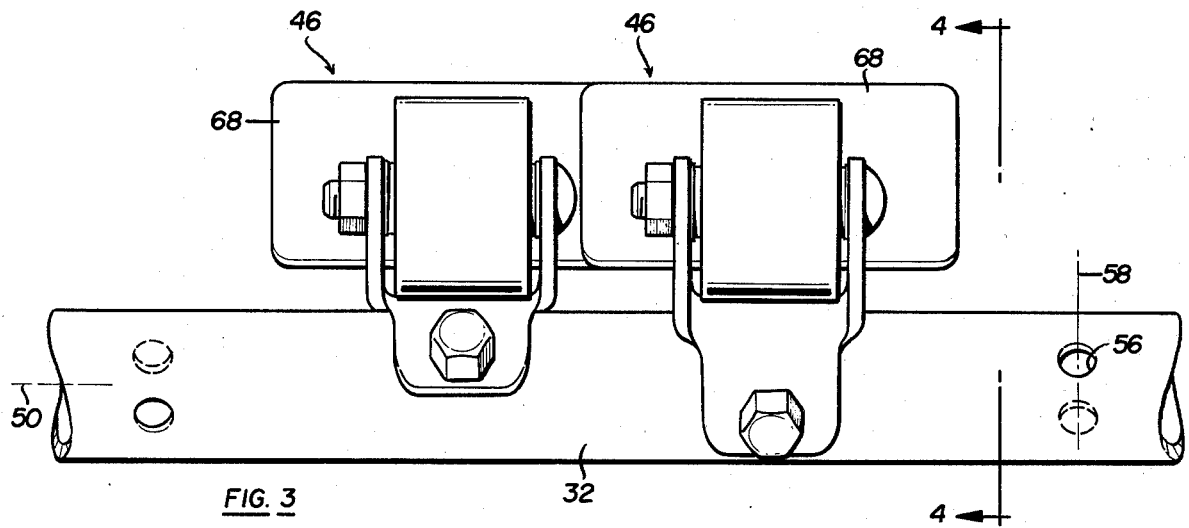
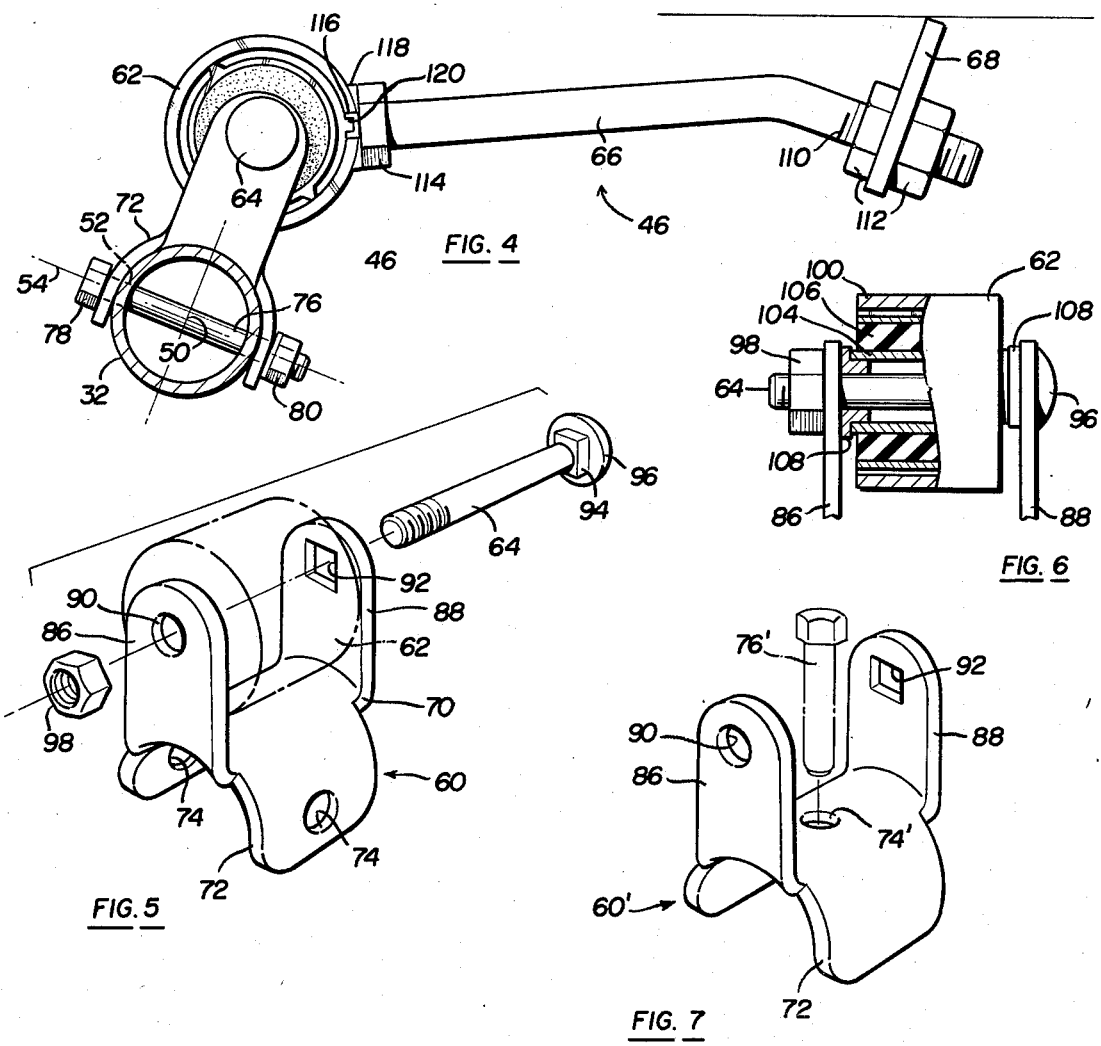

CONVEYOR BELT CLEANER

BACKGROUND OF THE INVENTION

1. Field of the Invention

A conveyor belt cleaner is for an endless conveyor belt trained about a pair of rollers and comprises a plurality of independently operable scraper blade assemblies for removing from the conveyor belt abrasive and/or foreign materials. Because of the tendency of the belt to accumulate adhering material, it is commonplace to provide beneath the return strand of the belt a plurality of scraper blades to remove this material.

2. Description of the Prior Art

My U.S. Pat. No. 3,342,312 dated Sept. 19, 1967, discloses a mechanical cleaner assembly mounted underneath the return run or strand of the conveyor belt and subjected primarily to bending and torsional forces. The cleaner includes a plurality of torsion spring or arms, each arm operating independently of the others. One end portion of each torsion spring or arm is fixedly connected to the supporting frame and the other end portion, which is free, is provided with a reversible wiper blade which is engageable with the conveyor belt to clean and wipe the abrasive material therefrom.

U.S. Pat. No. 3,504,786 of Carl G. Matson and the prior art cited therein, utilize coil springs in one form or another along with means for adjusting the spring load whereby the scraper blades on the arms are biased into engagement with the belt.

The Matson U.S. Pat. No. 3,674,131 dated July 4, 1972 discloses and describes a modified conveyor belt cleaner with an elastomer spring as illustrated in FIGS. 6 and 7 thereof. With such a construction, each scraper arm includes a sleeve-like part which embraces an elastomer, torsionally elastic torus that is mountable on a support and constrained or biased against turning about the axis of the torus so that the scraper arm has a bias load thereon. Difficulty has been encountered in installing and operating such conveyor belt cleaner.

In Matson U.S. Pat. No. 3,674,131, the upper and lower semi-circular halves (FIGS. 6 & 7), which are mounted on the tubular support, have a tendency to pivot around the support even though the connecting bolts are tightened as much as possible. The tendency to pivot resulted from the vibration and pressure of the belt.

The Matson U.S. Pat. No. 3,674,131 suggests utilizing spring arms of different lengths so that the wiper or scraper blades thereon do not hit each other and are in effect staggered. When a person attempted to achieve this offsetting or staggering effect, enormous assembly problems were encountered. When the bolts were loosened the entire assembly flopped down as a result of the weight of the arm and scraper blade. Sometimes as many as seventeen of these arms are provided on a single tubular support and to hold them in the proper offset position at the proper distance apart becomes very difficult.

A person encounters great difficulty in adjusting the height of the scraper blade of the cleaner of FIGS. 6 and 7 of U.S. Pat. No. 3,674,131 after it is in position under the belt. A conveyor belt is not always flat where the cleaner engages it and therefore the scraper blades have to be adjusted upward or downward.

With the belt cleaner of FIGS. 6 and 7 of U.S. Pat. No. 3,674,131 two wrenches are required, one for the bolt head 72 and one for the nut 74. As soon as the nut was loosened, the weight of the blade at the end of the arm tended to drop the assembly away from the belt. As a person attempted to use one hand to hold the scraper blade in the proper position, only one hand was free to tighten the nut. The whole bolt tended to turn thereby making it difficult to tighten the individual scraper blade arm assemblies so that they conform to any irregularities in the belt.

When a person obtains a belt cleaner, all the blade arm assemblies are locked in a horizontal plane. The cleaner is then mounted under the conveyor belt and by use of a pressure handle of some type, pivot the blades into contact with the belt. The irregularities of the belt are noted and adjustments are made to the individual springs upward or downward so that each individual blade is in contact with the belt before pressure is applied. This is quite important, for if it isn't done, some blades would be completely worn out before others had even come in contact with the belt. There is sometimes as much as 2 inches of irregularity from a horizontal plane in a wide belt.

The aforementioned prior art structures while generally satisfactory leave room for improvement in the areas of manufacture, economy, ease of assembly and disassembly, and maintenance.

SUMMARY OF THE INVENTION

Because of the problems encountered with the prior art, a one piece integral clamp is utilized rather than a two piece clamp of the type in the Matson U.S. Pat. No. 3,674,131. In addition, first and second series of clamp mounting openings are provided in the tubular support, with both series being arranged in a staggered or offset relationship to permit cleaners having spring arms of equal length to be mounted or positioned on the support without interference between adjacent cleaners. Adjacent cleaners are thereby offset and are located at the proper distance apart horizontally on the tubular support. The tubular support may be supplied with extra holes or openings so that the cleaners can be positioned at various locations thereon as selected by the customer.

The clamp may be provided with one or with a pair of mounting holes which overlie a pair of openings in the first or second series of openings provided in the tubular support and which are adapted to receive a fastening element for fixing the cleaner on the support.

The clamp includes an upper portion having a pair of spaced apart brackets, one bracket having a round hole and the other bracket having a rectangular shaped hole. The tubular elastomer element is located between the brackets; and a threaded carriage bolt or rod-like member, provided with a rectangular shaped shoulder, extends through the brackets and elastomer element. With such a construction the shoulder on the carriage bolt fits into the rectangular opening in the bracket and prevents the carriage bolt and parts connected thereto including the elastomer element, arm, and scraper blade, from pivoting. Thus a maintenance person will be able to position and hold the scraper blade assembly with the one hand which was previously required to hold the bolt from turning when adjusting the scraper blade upward or downward.

DESCRIPTION OF THE DRAWINGS

FIG. 3 is a fragmentary elevational view of the belt cleaner support looking in the direction of arrows 3—3 of FIG. 2.

FIG. 4 is an end view of the cleaner taken on the line 4—4 of FIG. 3.

FIG. 5 is a perspective view of one embodiment of the clamp.

FIG. 6 is an end view, partly in section, of the structure of FIG. 4.

FIG. 7 is a perspective view of a modified clamp.

DESCRIPTIONS OF PREFERRED EMBODIMENTS

Figure 1:
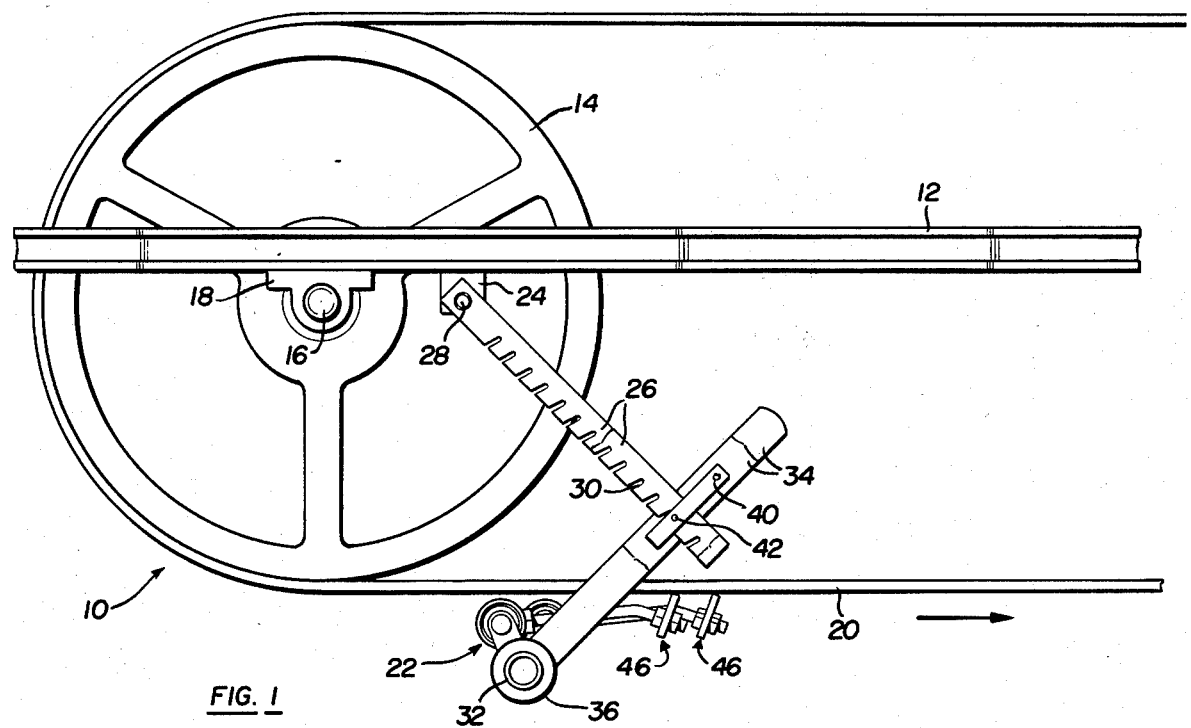
FIG. 1 is a fragmentary side view of the belt conveyor and of the mechanical cleaner therefor, with the cleaner mounted beneath the return strand of the conveyor belt and in an operative position.
Figure 2:
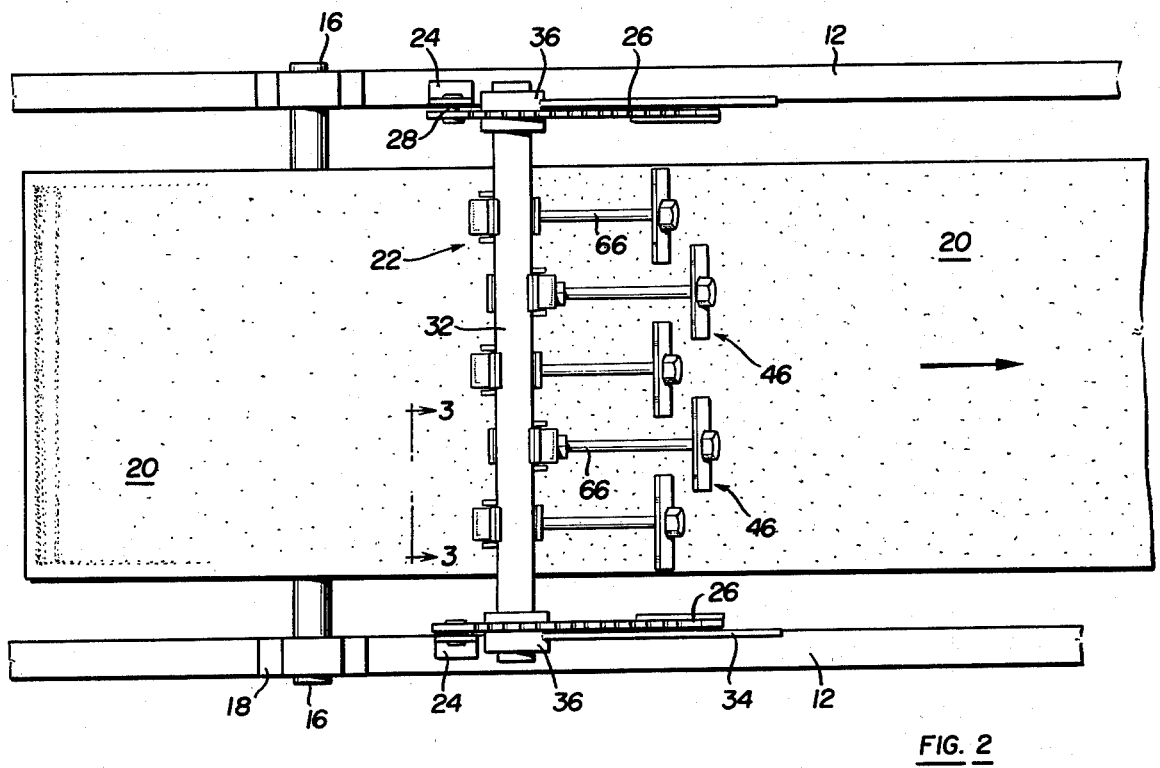
FIG. 2 is a fragmentary bottom view of the belt conveyor and cleaner illustrated in FIG. 1.

The conveyor illustrated in FIGS. 1 and 2 is designated by the numeral 10 and includes a frame 12 which supports a pair of pulleys or rollers, the head pulley or roller being designated by the numeral 14. The roller 14 is mounted on a shaft 16 which is supported by lugs or bearings 18 carried by the frame 12. Wrapped around the rollers is an endless conveyor belt 20. The life of the belt 20 may be extended by removing therefrom abrasive or foreign materials whether wet, dry or sticky. The belt 20 is cleaned by means of a mechanical belt cleaner designated by the numeral 22 in FIGS. 1 and 2.

The mechanical belt cleaner 22 includes a conventional mounting assembly for locating the cleaner 22 beneath the return run of the belt as shown in FIGS. 1 and 2. The mounting assembly comprises a pair of hanger clips 24, one at each side of frame 12, (FIG. 2) secured and fastened to the frame 12 by bolts or other means not shown. A hanger 26 is connected to each bracket 24 by a pin connection 28. Each hanger 26, located generally parallel to the belt 20 and at opposite sides thereof (FIG. 2), is provided with a plurality of slots 30.

The assembly further includes a transversely extending tube or tubular support 32 underneath the return strand of the belt 20 and spaced therefrom as shown in FIG. 1. Operating levers 34 provided with sleeve portions 36 at one end thereof are provided on opposite ends of the tubular support 32. One lever 34 is associated with a hanger 26 at opposite sides of the belt 20. Each lever 34 includes a locating element 40 carrying a pin 42 which is receivable in one of the slots 30 of the corresponding hanger 26 to position the wiper blade assemblies 46 relative to the belt 20 as is conventional in the art. The levers 34 assist in the positioning of the wiper blade assemblies 46 for proper blade pressure and other vertical adjustments as is well known in the art.

The tubular support or pipe 32 has a longitudinally extending axis 50. Holes or openings are drilled in the support 32 in a predetermined pattern described herein as first and second series of openings. The openings 52 in the first series are arranged in pairs of openings 52, each pair having an axis 54 which intersects and is perpendicular to the support axis 50 (FIG. 4). The axes 54 of the first series of openings 52 lie in a first plane containing the support axis 50. The support 32 may be of various lengths and thus may accommodate many pairs of openings 52. The axes 54 are generally spaced apart a uniform distance.

The support 32 is also provided with a second series of openings 56 arranged in pairs, each pair having an axis 58 which intersects the support axis 50 and is located at an acute angle relative thereto. The axes 58 of the second series of openings 56 are located in a second plane located at an acute angle relative to the first plane.

Thus the openings 52 are staggered or offset with respect to the openings 56. One pair of openings 52 is located next to but spaced from a pair of openings 56 in offsetting or staggering relation. Sometimes as many as 17 pairs of openings are provided on a support. The openings are drilled in the support 32 at predetermined intervals to provide uniform spacing. Extra openings may be provided in the support 32 so that the customer can position the blade assemblies 46 anywhere it is required to locate them on the support 32. The staggering of the openings or holes 52, 56 automatically positions the blade assemblies 46 (having arms of equal length) horizontally on the support 32 at the proper spacing and insures that the blade assemblies 46 overlap (FIG. 2) but do not hit each other.

Each wiper blade assembly 46 of the cleaner 22 is mounted at spaced intervals beneath the return strand of the belt 20 (FIG. 2) and includes the following: a one piece integral clamp 60; an elastomer element 62; a carriage bolt or rod-like member 64 extending through the clamp 60 and elastomer element 62; an elongated arm or rod 66; and a scraper or wiper blade 68.

The integral clamp 60 includes an upper portion 70 and a lower portion 72 which is of C-shape or semicylindrical configuration having an inner surface conforming to and abutting the tubular support 32. The lower portion 72 is provided with a pair of aligned openings 74 which overlie one pair of openings in the first or second series of openings 52, 56 provided in the tubular support 32. A bolt 76 having a hex head 78 extends through the aligned openings 74 and 52 or 56 in the clamp and support 32. A nut 80 is provided on the threaded end of bolt 76 and is tightened thereon to locate the clamp 70 and corresponding blade assembly 46 on the support. If a sufficient force strikes the blade 68 of the assembly 46, upon sidewise impact, the blade has a tendency to move excessively although the movement at the bolt 76 is very slight. Thus in certain situations or conditions it may be advisable to use the modified clamp 60' of FIG. 7 wherein a single hole 74' is provided in the top of the lower portion 72 of the modified clamp 60' rather than two holes 74. The use of bolt 76' has a tendency to pull the clamp down tightly against the support or pipe 32 thereby eliminating any sidewise movement of the blade 68 upon sidewise impact.

The upper portion 70 of the clamps 60 and 60' are identical. The upper portion 70 includes a pair of spaced apart upstanding brackets 86, 88. Bracket 86 has a circular opening 90 therein, while bracket 88 has a square opening 92 provided therein in axial alignment with opening 90.

The elongated rod-like member or carriage bolt 64 has a rectangular or square shape shoulder 94 at one end adjacent the head 96 and is threaded at the other end. The elastomer element 62, to be subsequently described, is tubular and has an axis which extends through the openings 90 and 92. The carriage bolt 64 is inserted through opening 92 in bracket 88, elastomer element 62 and opening 90 in bracket 86, with the shoulder 94 fitting within and conforming to the opening 92 in bracket 88. Once assembled the nut 98 is tightened on the threaded end of carriage bolt 64. Thus as disclosed in the Summary the use of a carriage bolt 64 and rectangular or square hole 92 allows a person to adjust the height of the wiper blade assembly 46 with only one wrench. The shoulder 94 on bolt 64 prevents the bolt 64 from turning or pivoting in the brackets 86, 88. Thus the person has one hand free to position and hold the wiper blade assembly 46.

The arm 66 is connected to the elastomer element or assembly 62 in the manner disclosed and described in the Matson U.S. Pat. No. 3,674,131 in connection with FIGS. 6 and 7 thereof. The arms 66 of the wiper blade assemblies 46 are of equal length as noted in the Summary. The assemblies 46 are of identical construction but are staggered.

The elastomer element 62 includes a generally cylindrical or tubular outer sleeve 100 in the form of a substantially closed C and an inner "hex" liner 104. An elastomer bushing or torus 106, that is torsionally as well as otherwise elastic, fits within the tubular sleeve 100 and is affixed thereto so that the exterior of the torus 106 is constrained against rotation relative to the outer sleeve 100. The interior of the torus 106 is affixed similarly to inner sleeve or liner 104 through which the carriage bolt 64 extends.

At opposite ends of the bushing or torus 106, washers 108 are received by the carriage bolt 64 and these are interposed respectively between the brackets 86, 88 and the torus or bushing 106. Each washer 108 has an integral "hex" projection which fits within the "hex" liner 104, whereby, in conjunction with frictional forces incurred by tightening the nut 98, to secure the liner 104 against rotation relative to the clamp 60.

Each arm 66 is preferably in the form of an ordinary bolt threaded at one end 110, so as to receive a blade 68 locked in place between a pair of nuts 112. The arm 66 is headed at 114 at its other end to provide an enlargement which is welded or otherwise rigidly attached to a sleevelike portion or tubular part or sleeve. This last mentioned sleeve 100 is substantially a closed C having its proximate edges providing a gap or keyway 116. The head 114 bridges the gap 116 and, by welding indicated at 118, fixes the dimension of the gap 116. The outer shell or sleeve 100 has a key 120 to fit the keyway 116 of shell 100 as shown in FIG. 4. The elastomer torus 106 is interposed between the sleeve 100 and the liner 104.

Considering the assembly described heretofore, it will be seen that the rod-like member or carriage bolt 64 is mounted by the elastomer means 62 so that twisting, deflection, etc. of the member 64 relative to the support means or clamp 60 is elastically resisted by the elastomer torus 106.

What is claimed is:

1. An assembly of cleaners for a conveyor belt comprising a tubular support provided with a longitudinally extending axis, a first series of openings in said support, the openings in said first series being arranged in pairs of openings in the support, each pair of openings having an axis intersecting the longitudinally extending axis of the support, the axis of the openings in said first series of openings being located in a first plane, a second series of openings in said support, the openings in said second series being arranged in pairs of openings in the support, each pair of openings of the second series being located adjacent a pair of aligned openings in said first series of openings but offset therefrom, each pair of openings in said second series of openings having an axis intersecting the longitudinally extending axis of the support, the axis of said pairs of openings in said second series of openings being located in a second plane located at an acute angle to said first plane, the pairs of openings in said first and second series of openings in the support providing means for mounting cleaners on the support, each cleaner of the assembly comprising a clamp carrying a rod-like member thereon having a longitudinally extending axis, an elastomer element in the form of a torus having an opening through which the rod-like member is secured, and a scraper arm secured to the elastomer element and disposed generally as a radius from the member axis, each scraper arm positioning a scraper blade adjacent the end thereof, the torus being torsionally elastic about the member axis to resist angular movement of the scraper arm about the member axis, and fastening means extending through the clamp of each cleaner into a pair of openings in the support, each of said scraper arms of the assembly having a single fixed longitudinal length and wherein every other one of said cleaners is adapted to be mounted to said support by fastening means extending through the clamp of each of said every other one of said cleaners and into said first series of pairs of openings in said support while the remaining alternate ones of said cleaners are adapted to be mounted to said support by fastening means extending through the clamp of each of said remaining alternate ones of said cleaners and into said second series of pairs of openings in said support so as to mount said cleaners horizontally on the support at the proper spacing to achieve a staggered overlapping arrangement of said scraper blades while using only said equal length scraper arms.

2. The assembly of cleaners defined in claim 1 wherein the clamp of each cleaner comprises a one piece clamp having upper and lower portions, said lower portion having a base shaped to fit the contour of the support, said upper portion having a pair of spaced apart brackets which receives said elastomer element therebetween, openings in said brackets aligned with the torus opening in said elastomer element, one of said bracket openings being round and the other of said bracket openings being rectangular, said rod-like member extending through the aligned openings in said brackets and in the torus of said elastomer element, said rod-like member extending through the aligned openings in said brackets and in the torus of said elastomer element, said rod-like member having a rectangular shaped shoulder on one end thereof which fits into the rectangular opening in said other bracket to prevent rotation of said rod-like member relative to said clamp about the longitudinally extending axis of the rod-like member.

3. The assembly of cleaners defined in claim 2 wherein said rectangular opening and said rectangular shaped shoulder of each cleaner are each in the form of a square.

4. The assembly of cleaners defined in claim 2 wherein said base of the clamp of each cleaner is provided with an inner surface of part cylindrical configuration which is adapted to seat against the support.

5. The assembly of cleaners defined in claim 4 wherein said base of the clamp of each cleaner is provided with a pair of openings located on an axis spaced from and arranged perpendicular to the axis of the rod-like member, said last mentioned openings being adapted to be aligned with a pair of openings in said first or second series of openings provided in the support for receiving said fastening means.

6. The assembly of cleaners defined in claim 4 wherein said base of the clamp of each cleaner is provided with a single opening having an axis which intersects and is perpendicular to the axis of the rod-like member, said last mentioned opening being adapted to be aligned with a pair of openings in said first or second series of openings provided in the support for receiving said fastening means.

7. The assembly of cleaners defined in claim 4 wherein said base of the clamp of each cleaner is of C-shaped configuration, with said brackets being located at the sides of said base and midway between the end portions thereof and extending upwardly from said base.

8. The assembly of cleaners defined in claim 7 wherein said base of the clamp of each cleaner is provided with a pair of openings in the end portions thereof which are located on an axis spaced from and arranged perpendicular to the axis of the rod-like member, said last mentioned openings being adapted to be aligned with a pair of openings in said first or second series of openings provided in the support for receiving said fastening means.

9. The assembly of cleaners defined in claim 7 wherein said base of the clamp of each cleaner is provided with a single centrally located opening midway between the end portions thereof which has an axis which intersects and is perpendicular to the axis of the rod-like member, said last mentioned opening being adapted to be aligned with a pair of openings in said first or second series of openings provided in the support for receiving said fastening means.

* * * * *